(12) United States Patent
Zhao et al.

(10) Patent No.: US 9,980,256 B2
(45) Date of Patent: May 22, 2018

(54) METHOD AND APPARATUS FOR PUCCH RESOURCE MAPPING

(71) Applicant: Samsung Electronics Co., Ltd., Gyeonggi-do (KR)

(72) Inventors: Zheng Zhao, Beijing (CN); Yingyang Li, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 35 days.

(21) Appl. No.: 14/397,388

(22) PCT Filed: Apr. 17, 2013

(86) PCT No.: PCT/KR2013/003241
§ 371 (c)(1),
(2) Date: Oct. 27, 2014

(87) PCT Pub. No.: WO2013/162203
PCT Pub. Date: Oct. 31, 2013

(65) Prior Publication Data
US 2015/0092628 A1    Apr. 2, 2015

(30) Foreign Application Priority Data

Apr. 27, 2012 (CN) .......................... 2012 1 0129540

(51) Int. Cl.
*H04W 72/04* (2009.01)
*H04B 7/26* (2006.01)
(Continued)

(52) U.S. Cl.
CPC ...... *H04W 72/0413* (2013.01); *H04B 7/2656* (2013.01); *H04L 1/1861* (2013.01);
(Continued)

(58) Field of Classification Search
None
See application file for complete search history.

(56) References Cited

U.S. PATENT DOCUMENTS

2009/0180435 A1    7/2009  Sarkar
2010/0085927 A1*   4/2010  Torsner ................ H04L 1/1822
                                                                                    370/329

(Continued)

FOREIGN PATENT DOCUMENTS

RU       2010 133 235         2/2012
WO       WO 2010/112065       10/2010
(Continued)

OTHER PUBLICATIONS

PCT/ISA/237 Written Opinion issued on PCT/KR2013/003241(pp. 4).

(Continued)

*Primary Examiner* — Diane Lo
*Assistant Examiner* — Tito Pham
(74) *Attorney, Agent, or Firm* — The Farrell Law Firm, P.C.

(57) ABSTRACT

A method for PUCCH resource mapping is provided, which includes in a traffic adaptive TDD system, classifying downlink sub-frames within a binding window into sub-frames of a first category and sub-frames of a second category, when feeding back HARQ-ACK (Hybrid Automatic Repeat request- Acknowledgement) for a downlink sub-frame, performing PUCCH (Physical Uplink Control Channel) resource mapping for a sub-frame of the first category in accordance with LTE/LTE-A, and performing PUCCH resource mapping for a sub-frame of the second category according to a specified order of sub-frames.

18 Claims, 5 Drawing Sheets

(51) Int. Cl.
    *H04L 1/18*    (2006.01)
    *H04L 5/00*    (2006.01)
    *H04L 5/14*    (2006.01)
(52) U.S. Cl.
    CPC .............. *H04L 5/0055* (2013.01); *H04L 5/14* (2013.01); *H04L 5/1469* (2013.01)

(56) References Cited

U.S. PATENT DOCUMENTS

| | | | | |
|---|---|---|---|---|
| 2010/0281326 | A1* | 11/2010 | Ahn | H04L 1/1812 714/749 |
| 2010/0322187 | A1* | 12/2010 | Tani | H04L 1/0007 370/331 |
| 2011/0268053 | A1* | 11/2011 | Che | H04L 1/1621 370/329 |
| 2012/0052899 | A1* | 3/2012 | Wang | H04W 52/226 455/513 |
| 2012/0057547 | A1* | 3/2012 | Lohr | H04L 5/0007 370/329 |
| 2013/0294423 | A1* | 11/2013 | Wang | H04N 21/2365 370/336 |
| 2015/0092628 | A1* | 4/2015 | Zhao | H04L 1/1861 370/280 |

FOREIGN PATENT DOCUMENTS

| | | | |
|---|---|---|---|
| WO | WO 2010112065 A1 * | 10/2010 | .............. H04L 1/00 |
| WO | WO 2011/120011 | 9/2011 | |

OTHER PUBLICATIONS

PCT/ISA/210 Search Report issued on PCT/KR2013/003241 (pp. 3).

3GPP TSG RAN WG1 Meeting #56bis, Seoul, Korea, Mar. 23-27, 2009, PUCCH resource region for LTE-A, pp. 6.

3GPP TSG-RAN-WG1 Meeting #54, Jeju, Korean, Aug. 18-22, 2008, Adaptive scheduling of UL ACK/NAK feedback method in LTE TDD, pp. 6.

3GPP TSG RAN WG1 Meeting #53bis, Warzaw, Poland, Jun. 30-Jul. 4, 2008, Considerations on PUCCH indexing scheme for LTE TDD, pp. 4.

European Search Report dated Feb. 16, 2016 issued in counterpart application No. 13781102.2-1851, 7 pages.

Russian Office Action dated Nov. 29, 2016 issued in counterpart application No. 2014147700/07, 27 pages.

Japanese Office Action dated Jan. 4, 2017 issued in counterpart application No. 2015-508854, 6 pages.

* cited by examiner

METHOD AND APPARATUS FOR PUCCH RESOURCE MAPPING

PRIORITY

This application is a National Phase Entry of PCT International Application No. PCT/KR2013/003241, which was filed Apr. 17, 2013, and claims priority to Chinese Patent Application No. 201210129540.0, which was filed on Apr. 27, 2012 in the Chinese Intellectual Property Office, the contents of which are incorporated herein by reference.

BACKGROUND OF THE INVENTION

1. Field of the Invention

The present invention relates generally to wireless communications, and more particularly, to a method and apparatus for resource mapping for ACK (ACKnowledgment) and NACK (Negative ACKnowledgement) in a PDSCH (Physical Downlink Shared Channel) in a traffic adaptive TDD (Time Division Duplexing) system, when TDD Uplink-Downlink (UL/DL) configuration of a cell dynamically changes with changes in uplink and downlink traffic loads.

2. Description of the Related Art

LTE (Long Term Evolution) supports two duplexing modes, i.e. FDD (Frequency Division Duplexing) and TDD. FIG. 1 illustrates a frame structure in a conventional LTE TDD system. Each radio frame has a length of 10 ms, and is divided uniformly into two half-frames each of which having a length of 5 ms. Each half-frame includes 8 time slots of 0.5 ms and 3 special fields of 1 ms, i.e. DwPTS (Downlink Pilot Time Slot), GP (Guard Period) and UpPTS (Uplink Pilot Time Slot). Each sub-frame is composed of two consecutive time slots.

Transmission in a TDD system includes: transmission from a base station to a UE (User Equipment) (referred to as downlink transmission) and transmission from a UE to a base station (referred to as uplink transmission). According to the frame structure shown in FIG. 1, there are 10 sub-frames shared by uplink and downlink in every 10 ms. Each sub-frame may be allocated to uplink or downlink, and a sub-frame allocated to uplink is referred to as an uplink sub-frame, a sub-frame allocated to downlink referred to as a downlink sub-frame. TDD systems support 7 types of uplink-downlink configurations as shown in Table 1, where D represents Downlink sub-frame, U represents Uplink sub-frame, and S represents Special sub-frames in the 3 special fields.

TABLE 1

| Configuration serial number | Switch-point periodicity | sub-frame index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

An advanced version of the LTE technique has been proposed to increase a transmission data rate of users. The advanced version of the LTE TDD system has the same HARQ (Hybrid Automatic Repeat Request) transmission timing with LTE. The following is a brief introduction to HARQ transmission timing of downlink data in LTE and the advanced version of LTE.

HARQ-ACK of PDSCH may be transmitted in a PUSCH (Physical Uplink Shared Channel) or a PUCCH (Physical Uplink Control Channel). Regarding the PDSCH to PUCCH/PUSCH timing, supposing a UE feeds back HARQ-ACK in PUCCH/PUSCH in sub-frame n, the PUCCH/PUSCH indicates HARQ-ACK information of PDSCH in downlink sub-frames n−k or HARQ-ACK information on SPS (Semi-Persistent Scheduling) release.

Table 2 provides definition of the value of k∈K. K is a collection of M elements $\{k_0, k_1, \ldots, k_{M-1}\}$, is related with sub-frame serial number and UL/DL configurations, and is referred to as a downlink association set. Element k is referred to as downlink association element. Herein, downlink sub-frames corresponding to a downlink association set are referred to as bundling window for short, i.e. for all elements k in K, a collecting composed of n−k is referred to as a bundling window, {n−k, k∈K}. A piece of PUCCH resource in a PUCCH sub-frame is allocated for each PDSCH in each downlink sub-frame for feeding back HARQ.

TABLE 2

| Configuration serial number | sub-frame n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

With demands for a larger transmission data rate, a traffic adaptive TDD technique has been discussed in terms of higher LTE versions. The traffic adaptive TDD technique dynamically adjusts the ratio of uplink sub-frames to downlink sub-frames to keep the current uplink-downlink configuration more consistent with the ratio of uplink traffic load to downlink traffic load, to increase uplink-downlink peak rate of users and system throughput.

In a traffic adaptive TDD system, the UL/DL configuration adopted for timing from PDSCH to PUCCH/PUSCH may be different from the actual configuration adopted in the system, e.g. a UL/DL configuration may be specified via upper layer signaling, and HARQ-ACK of PDSCH is fed back according to the timing corresponding to the UL/DL configuration regardless of the actual UL/DL configuration adopted by the system. In order to have HARQ-ACK of PDSCH in more sub-frames be fed back, the configuration specified via upper layer signaling usually includes a relatively larger number of sub-frames. For example, the TDD UL/DL configuration specified may be UL/DL configuration 2 while the actually adopted TDD UL/DL configuration may be configuration 0, configuration 1, or configuration 6. Since downlink sub-frames covered by the actually adopted configuration is a sub set of the downlink sub-frames covered by the specified configuration, and the resource of HARQ-ACK fed back for PDSCH in all of the downlink sub-frames covered by the specified configuration can be found in uplink sub-frames, the resource of HARQ-ACK fed back for PDSCH in all of the downlink sub-frames covered by the actually adopted configuration can be found in uplink sub-frames. Thus, HARQ-ACK of all downlink sub-frames covered by the actually adopted configuration can be fed back as long as the downlink sub-frames covered by the actually adopted configuration is a sub set of the downlink sub-frames covered by the specified configuration.

In practice, higher version UEs and lower version UEs co-exist. The higher version UE refers to a UE using a higher version of LTE standards, and the lower version UE refers to a UE using a lower version of LTE standards. For example, a higher version UE may support dynamic traffic adaptive TDD while a lower version UE may not support dynamic traffic adaptive TDD. For PDSCH to PUCCH/PUSCH timing, a lower version UE and the higher version UE may adopt different UL/DL configurations. Due to the different configurations adopted, one uplink sub-frame may adopt different bundling windows, which is the size of downlink subframes fed back in this uplink subframe.

FIG. 2 illustrates a higher version UE configuration and a lower version UE configuration, according to the prior art. In FIG. 2, D and S in a sub-frame represent downlink sub-frames, and U represents uplink sub-frames. A higher version UE adopts the timing scheme of UL/DL configuration 2 for feeding back HARQ-ACK of PDSCH, and a lower version UE adopts the timing scheme of UL/DL configuration 0 for feeding back HARQ-ACK of PDSCH. When feeding back HARQ-ACK of PDSCH in the same uplink sub-frame 201 according to respective timing schemes, the higher version UE feeds back HARQ-ACK for downlink sub-frames in dashed box 202, and the lower version UE feeds back HARQ-ACK for downlink sub-frame 203. The dashed box 202 denotes a bundling window. Sub-frames 206 and 203 have the same serial number. HARQ-ACK of sub-frame 206 may be fed back in PUCCH resource field of the lower version UE, while HARQ-ACK of other downlink sub-frames 204, 205 and 207 may be fed back in other PUCCH resource fields.

In addition, the configuration specified by upper layer for a higher version UE may cover more downlink sub-frames. A conventional manner may reserve PUCCH resources for each downlink sub-frame covered by the specified configuration and decrease the downlink sub-frames covered by the actually adopted configuration to be fewer than those covered by the specified configuration. Thus, not all of the reserved PUCCH resources are used, resulting in a waste of PUCCH resources.

Accordingly, there is a need for solutions to the problem regarding compatibility between higher version UEs and lower version UEs and to the problem of wasting PUCCH resources during transmission of HARQ-ACK of PDSCH.

SUMMARY OF THE INVENTION

The present invention has been made to address at least the above problems and/or disadvantages and to provide at least the advantages described below. Accordingly, an aspect of the present invention provides a method for PUCCH resource mapping which can avoid wasted PUCCH resources in a traffic-adaptive TDD system.

According to an aspect of the present invention, a method for PUCCH (Physical Uplink Control Channel) resource mapping, applied in a wireless communication system where PUCCH in sub-frame n carries HARQ-ACK (Hybrid Automatic Repeat request-Acknowledgement) information, includes classifying PUCCH resources in sub-frame n into two categories, loading HARQ-ACK information of a sub-frame from a first category into a field belonging to resources of first category, and mapping HARQ-ACK information corresponding to all of downlink data of sub-frames from a second category onto a field belonging to resources of the second category in a descending order of scheduling probability, with downlink data of high scheduling probability mapped onto PUCCH resources located far from PUSCH resources.

According to an aspect of the present invention, an apparatus for PUCCH (Physical Uplink Control Channel) resource mapping, applied in a wireless communication system where PUCCH in sub-frame n carries HARQ-ACK information, includes a controller which classifies PUCCH resources in sub-frame n into two categories, loads HARQ-ACK (Hybrid Automatic Repeat request- Acknowledgement) information of a sub-frame from first category into a field belonging to resources of a first category, and maps HARQ-ACK information corresponding to all of downlink data of sub-frames from a second category onto a field belonging to resources of the second category in a descending order of scheduling probability, with downlink data of high scheduling probability mapped onto PUCCH resources located far from PUSCH resources.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE INVENTION

Figure 1:
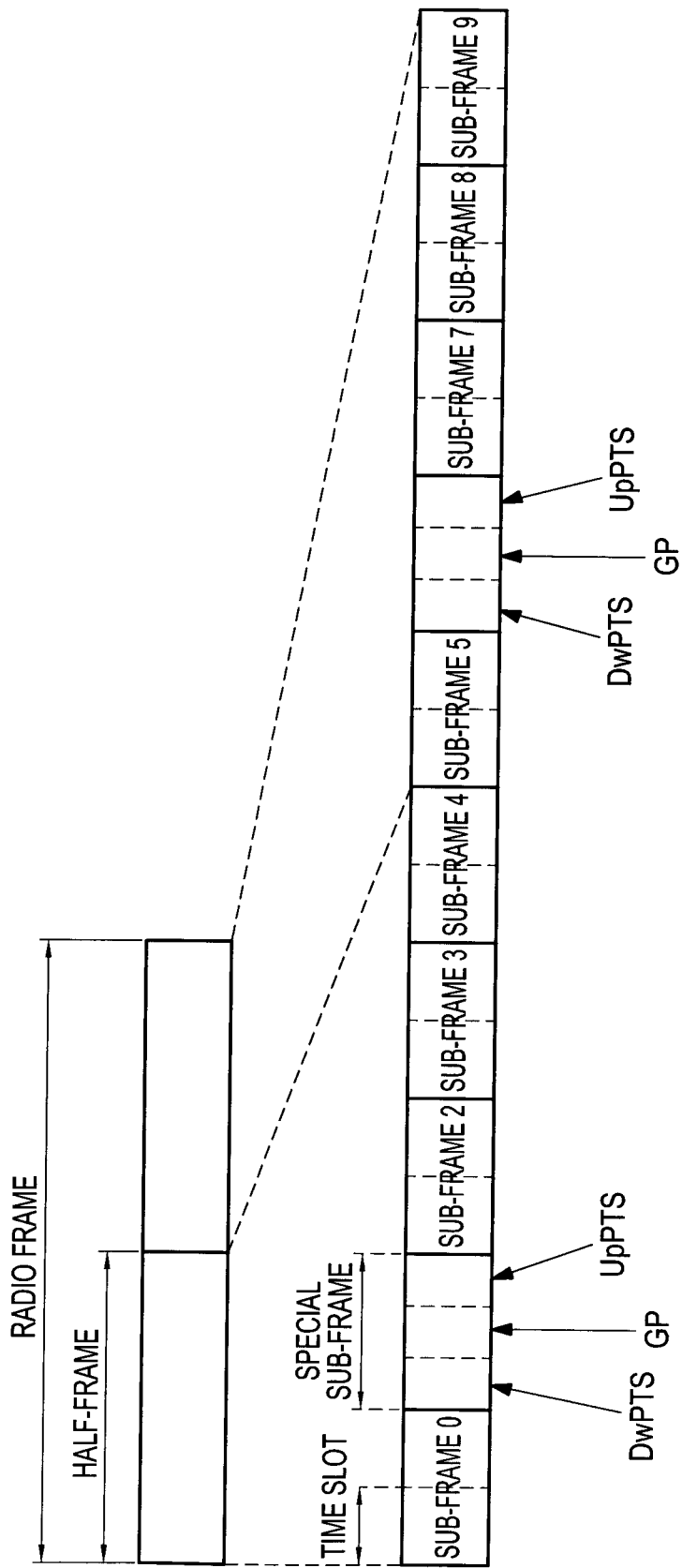
FIG. 1 illustrates a frame structure in a LTE TDD system, according to the prior art.
Figure 2:
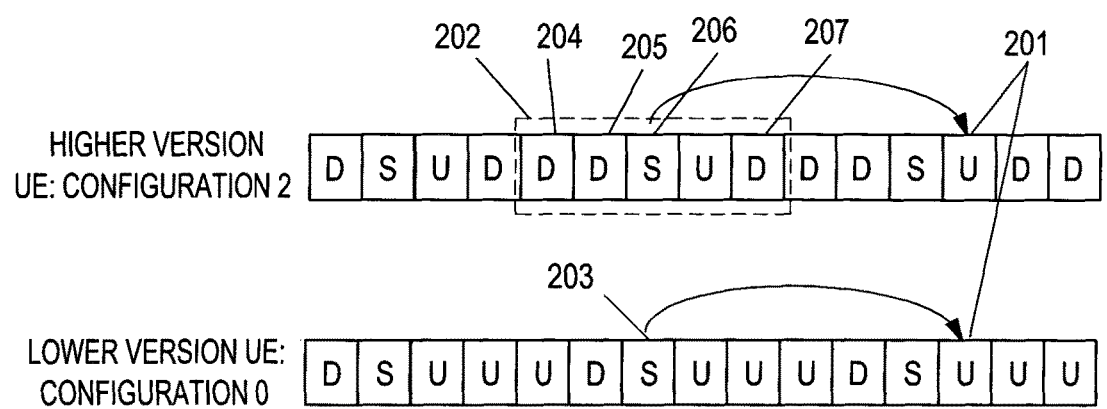
FIG. 2 illustrates a higher version UE configuration and a lower version UE configuration, according to the prior art.

Hereinafter, various embodiments of the present invention will be described with reference to the accompanying drawings. A detailed description of known functions and configurations incorporated herein will be omitted for the sake of clarity and conciseness.

In a traffic adaptive TDD system, the UL/DL configuration adopted for PDSCH to PUCCH/PUSCH timing may be different from the actual uplink to downlink proportion in the system. For example, an UL/DL configuration may be specified via upper layer signaling, and HARQ-ACK of PDSCH is fed back according to the timing scheme corresponding to the UL/DL configuration specified regardless of the actual uplink-to-downlink proportion.

In the following, the serial number of a downlink sub-frame in a frame is referred to as sub-frame ID. According to a PDSCH to PUCCH/PUSCH mapping scheme as shown above in Table 2, HARQ-ACK in uplink sub-frame n indicates HARQ-ACK of PDSCH in downlink sub-frames n−k or HARQ-ACK of SPS release, where k∈K, K is a downlink association set. Sub-frame ID of a sub-frame corresponding to an element k in the downlink association set is x, as in the following Equation (1):

$$x=(n-k)\bmod 10 \qquad (1)$$

In the following description, a TDD UE which supports dynamic traffic adaptive is referred to as traffic adaptive UE, and a TDD UE which does not support dynamic traffic adaptive is referred to as a non-traffic adaptive UE.

The present invention provides PUCCH resource mapping when two categories of UEs conforming to different PDSCH HARQ timing schemes co-exist in one system. For example, UEs from the first category are non-traffic adaptive UEs, and UEs from the second category are traffic adaptive UEs. The following description uses traffic adaptive UEs and non-traffic adaptive UEs as an example for illustrating a method disclosed in the present invention.

A first method of the present invention refers to a few examples. First, when the timing of PDSCH HARQ specified by upper layer signaling is configuration 2, actual configuration may change between configurations 0, 1, 2, 6, and a non-traffic adaptive UE is informed of using a UL/DL configuration of configuration 0 by SIB1 (System Information Block 1) signaling, as shown in FIG. 3, which illustrates distribution of downlink sub-frames according to different configurations according to an embodiment of the present invention.

Figure 3:
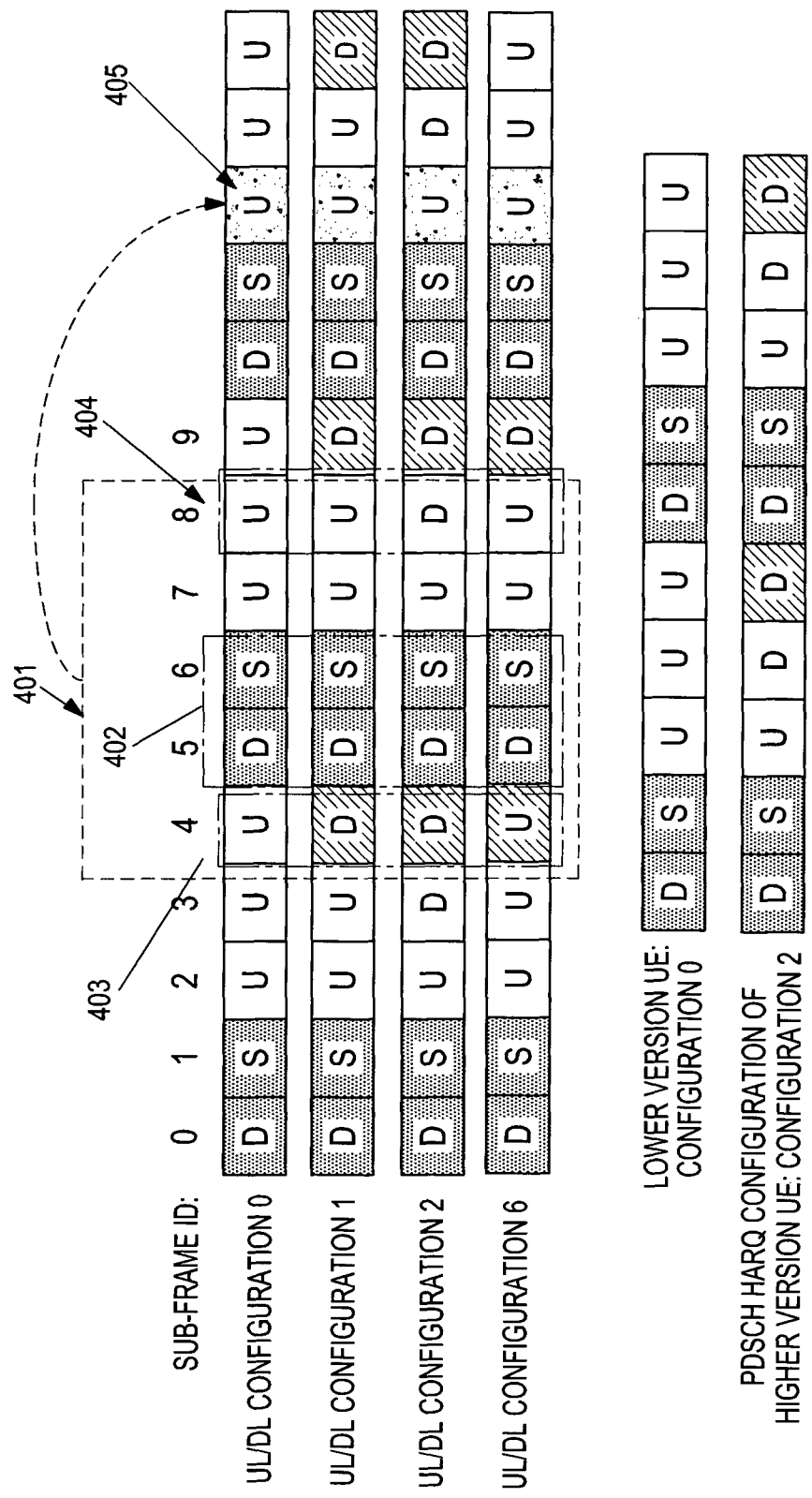
FIG. 3 illustrates distribution of downlink sub-frames according to different configurations according to an embodiment of the present invention.

In FIG. 3, according to configuration 2, downlink sub-frames in 401 forms a bundling window, and HARQ-ACK of PDSCH is fed back in uplink sub-frame 405. Within the bundling window 401, sub-frames in box 402 (i.e. sub-frames 5 and 6) are downlink sub-frames in all configurations, i.e. these sub-frames are always downlink sub-frames in any actual configuration, sub-frames in box 403 (i.e. sub-frame 4) are always a downlink sub-frame in the 2 of the configurations in the figure, and sub-frames in box 404 (i.e. sub-frame 8) are a downlink sub-frame in 1 of the configurations in the figure. It can be seen that the sub-frames in box 402 have the best chance of becoming downlink sub-frames, and sub-frames in box 401 have the least chance of becoming downlink sub-frames.

Thus, it can be regarded that the sub-frames in box 402 have a relatively high probability of being scheduled as downlink sub-frames while the sub-frames in box 401 have a relatively low probability of being scheduled as downlink sub-frames. Therefore, an embodiment of the present invention configures PUCCH resources of downlink sub-frames in 402 at a PUCCH resource field which is located the closest to the PUCCH resource field for a non-traffic adaptive UE, and configures PUCCH resources of downlink sub-frames in 404 at a PUCCH resource field which is located the farthest from the PUCCH resource field for non-traffic adaptive UE when performing PUCCH resource mapping. In this manner, when the downlink sub-frames in 404 are not scheduled, the PUCCH resources corresponding to these sub-frames are not occupied and are located at the border of PUCCH resource field, and therefore can be used as other channels, which avoids a waste of resources.

Figure 4:
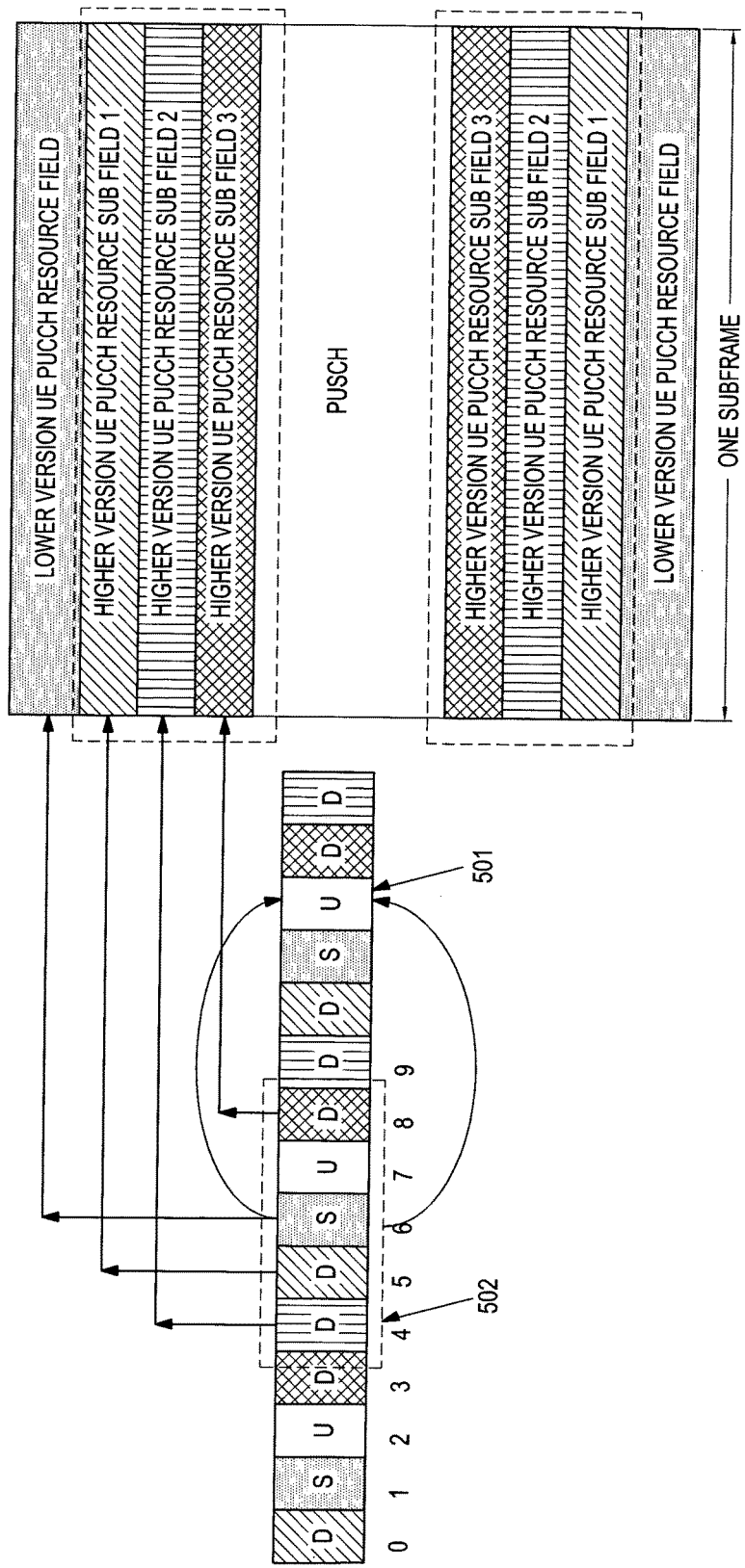
FIG. 4 illustrates different resource mapping schemes of downlink sub-frames according to an embodiment of the present invention.

FIG. 4 illustrates resource mapping according to the present invention. In configuration 2, downlink sub-frames in 502 form a bundling window, and HARQ-ACK of PDSCH is fed back in uplink sub-frame 501. Since the UL/DL configuration of the non-traffic adaptive UE specified by SIB1 signaling is configuration 0, HARQ-ACK of PDSCH in sub-frame 6 is also fed back in uplink sub-frame 501 according to configuration 0 timing scheme. During resource mapping for a traffic adaptive UE, HARQ-ACK of PDSCH in sub-frame 6 in the bundling window is mapped to PUCCH resource field of the non-traffic adaptive UE, HARQ-ACK of PDSCH in sub-frame 5 is mapped to PUCCH resource sub field 1 of the higher version UE, HARQ-ACK of PDSCH in sub-frame 4 is mapped to PUCCH resource sub field 2 of the higher version UE, and HARQ-ACK of PDSCH in sub-frame 8 is mapped to PUCCH resources located farthest from resources fields of a lower version UE.

In resource mapping for a traffic adaptive UE, sub-frames which need to be mapped to resource fields of a non-traffic adaptive UE are first identified within the bundling window, and are mapped according to a resource mapping scheme for a non-traffic adaptive UE. Then, the sub-frames which have been mapped are removed, and the remaining sub-frames are processed through PUCCH resource mapping in a certain order. Alternatively, all HARQ-ACK of the traffic adaptive UE may be all mapped onto PUCCH resource fields of the traffic adaptive UE without treating each sub-frame individually. In the resource fields, the same manner is adopted, i.e., the HARQ-ACK of the sub-frames are mapped in turn onto PUCCH resources from PUCCH resources located closest to the resource field of a non-traffic adaptive UE to PUCCH resources located farthest from the resource field of a non-traffic adaptive UE in a descending order of the probabilities of the downlink sub-frames being scheduled.

Figure 5:
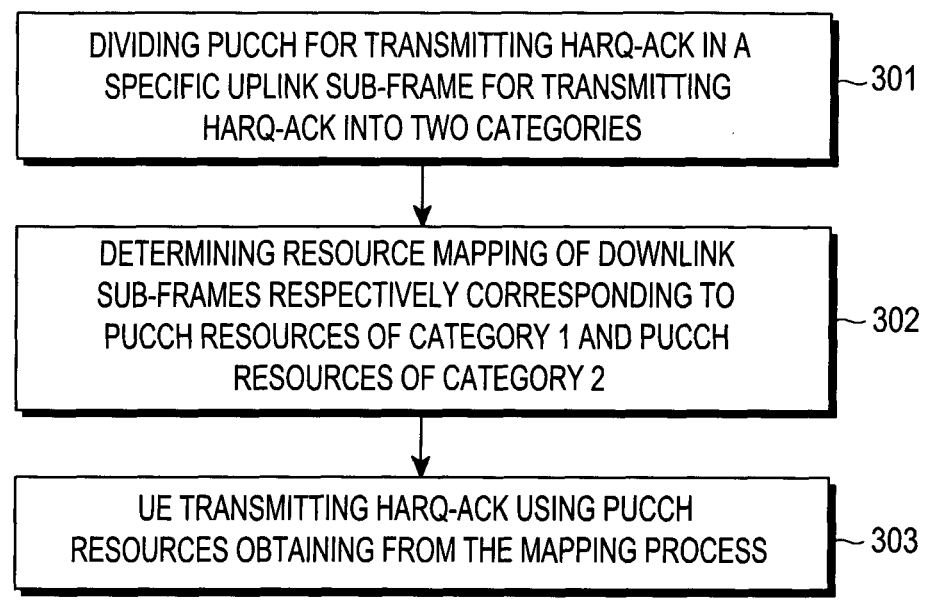
FIG. 5 is a flowchart illustrating a method according to an embodiment of the present invention.

FIG. 5 is a flowchart illustrating a method for PUCCH resource mapping according to an embodiment of the present invention. As shown in FIG. 5, the flowchart uses HARQ-ACK information transmitted in a specific uplink sub-frame n as an example to illustrate the PUCCH resource mapping scheme of the uplink sub-frame. The process includes the following procedures.

In step 301, PUCCH resources for delivering HARQ-ACK in a specific uplink sub-frame n for HARQ-ACK transmission are classified into the following two categories.

The PUCCH resources are divided into two categories to distinguish a PUCCH resource field for a non-traffic adaptive UE and a PUCCH resource field for a traffic adaptive UE.

(1) First Classification Category

The classification is performed based on the downlink sub-frames for PDCCH transmission corresponding to PUCCH for HARQ-ACK transmission.

Regarding the first category, if the PDCCH corresponding to the HARQ-ACK transmitted in the PUCCH resides in a downlink sub-frame corresponding to an HARQ timing scheme determined for TDD UL/DL configuration specified in system information (e.g. SIB1) for a non-traffic adaptive TDD UE, the PUCCH resources belongs to the first category.

Regarding the second category, if the PDCCH corresponding to the HARQ-ACK transmitted in the PUCCH does not reside in a downlink sub-frame corresponding to an HARQ timing scheme determined for TDD UL/DL configuration specified in system information (e.g. SIB1) for a non-traffic adaptive TDD UE, the PUCCH resources belongs to the second category.

The first classification may be implemented according to the following procedures.

A sub-frame collection 1 is first generated using all of downlink sub-frames within a bundling window of sub-frame n according to UL/DL configuration of a non-traffic adaptive UE, PUCCH resources which carry the HARQ-ACK information of a downlink sub-frame belonging to the sub-frame collection 1 are taken as the resources of the first category, and PUCCH resources which carry the HARQ-ACK information of a downlink sub-frame not belonging to the sub-frame collection 1 are taken as the resources of the second category.

The above classification method is illustrated with reference to an example involving a dynamic traffic adaptive TDD UE. For an uplink sub-frame whose sub-frame ID is n, a downlink association set $K_1$ or a bundling window $W_1=$ n−$K_1$ for UL/DL configuration of a non-dynamic traffic adaptive TDD UE and a downlink association set $K_2$ or a bundling window $W_2$=n−$K_2$ for a timing scheme of a dynamic traffic adaptive TDD UE may be obtained. Downlink sub-frames within $W_2$ are divided into two parts. One part is the intersection of $W_1$ and $W_2$, i.e., $W_1 \cap W_2$, and HARQ-ACK for sub-frames in this part is transmitted in resources of the first category, and the other part is a set of sub-frames containing sub-frames only included in $W_2$, i.e. $W_2 - W_1 \cap W_2$, and HARQ-ACK for sub-frames in this part is transmitted in resources of the second category.

For example, UL/DL configuration specified in system information (e.g. SIB1) for non-traffic adaptive UE is configuration 0. The sub-frame for feeding back HARQ-ACK is an uplink sub-frame whose sub-frame ID n=2, the downlink association set of non-traffic adaptive UE is $K_1$={6}, and the bundling window is $W_1$={n−6}. The system indicates a dynamic traffic adaptive TDD UE to adopt the timing scheme of configuration 2 for transmitting HARQ-ACK of a PDSCH. The uplink sub-frame 2 in configuration 2 is corresponding to a downlink association set of $K_2$={8, 7, 4, 6} and a bundling window of $W_2$={n−8, n−7, n−4, n−6}. According to the above classification method, PUCCH resources of the first category are PUCCH resources corresponding to sub-frames {n−6}, and PUCCH resources of the second category are PUCCH resources corresponding to sub-frames {n−8, n−7, n−4}.

(2) Second Classification Category

The classification is performed based on whether the TDD UE is dynamic traffic adaptive. The specific method is as follows.

Regarding the first category, if the HARQ-ACK is transmitted by a non-traffic adaptive UE, the PUCCH resources for the HARQ-ACK belong to the first category, and the bundling window of the UE includes downlink sub-frames corresponding to resources from the first category for transmitting HARQ-ACK.

Regarding the second category, if the HARQ-ACK is transmitted by a traffic adaptive UE, the PUCCH resources for the HARQ-ACK belong to the second category, and the bundling window of the UE includes downlink sub-frames corresponding to resources from the second category for transmitting HARQ-ACK.

A downlink associating set $K_1$ or a bundling window $W_1$=n−$K_1$ of an uplink sub-frame n for a non-traffic adaptive UE may be obtained based on the PDSCH to PUCCH/PUSCH timing as shown above in Table 2. HARQ-ACK of downlink sub-frames in $W_1$ are all transmitted using resources of the first category, i.e. PUCCH resources for transmitting HARQ-ACK of downlink sub-frames in $W_1$ are resources of the first category. A downlink associating set $K_2$ or a bundling window $W_2$=n−$K_2$ of an uplink sub-frame n for a traffic adaptive UE may be obtained based on the PDSCH to PUCCH/PUSCH timing as shown in Table 2. HARQ-ACK of downlink sub-frames in $W_2$ are all transmitted using resources of the second category, i.e. PUCCH resources for transmitting HARQ-ACK of downlink sub-frames in $W_2$ are resources of the second category.

In step 302, resource mappings of downlink sub-frames corresponding to PUCCH of first category and PUCCH of the second category are respectively determined first category second category, as described below.

(1) Resource mapping is performed on downlink sub-frames corresponding to HARQ-ACK transmitted by PUCCH resources of the first category according to a PUCCH resource mapping method for a non-traffic adaptive UE. The downlink sub-frames corresponding to HARQ-ACK transmitted by PUCCH resources of the first category are referred to as sub-frames of the first category in the following description.

In 3GPP Rel-10 and its lower versions, block interleaving is applied in resource mapping. In the present invention, PUCCH resource mapping is performed according to the manner defined in 3GPP Rel-10 and lower versions.

In an embodiment, supposing sub-frame s is a sub-frame of first category and is corresponding to downlink associating element $k_m$ in a bundling window of PDSCH HARQ timing of a non-traffic adaptive UE. PDCCH indicating PDSCH transmission or indicating downlink SPS release is detected in sub-frame s, and the PUCCH resources corresponding to the PDCCH are set forth as in the following Equation (2):

$$n_{PUCCH}^{(1)} = (N-m-1) \times N_p + m \times N_{p+1} + n_{CCE} + \hat{N}_{PUCCH}^{(1)} \quad (2)$$

The UE needs to select a parameter p to make $N_p \le n_{CCE} < N_{p+1}$, where $N_p = \max\{0, \lfloor [N_{RB}^{DL} \times (N_{sc}^{RB} \times p-4)]/36 \rfloor\}$. $n_{CCE}$ is the serial number of the first CCE for transmitting the PDCCH in sub-frame s, and $N_{PUCCH}^{(1)}$ is specified by the upper layer.

(2) Resource mapping is performed on downlink sub-frames corresponding to HARQ-ACK transmitted by resources of the second category. The downlink sub-frames corresponding to HARQ-ACK transmitted by resources of the second category are referred to as sub-frames of the second category in this description.

The procedure of determining the order of performing the resource mapping provides that the downlink data having large scheduling probability is processed through resource mapping with high priority, i.e. is mapped onto PUCCH resources of high priority which are far from PUSCH resources in the frequency domain. That is, downlink data with large scheduling probability is first processed through resource mapping, and is first mapped onto PUCCH resources located far from PUSCH resources. In a traffic adaptive TDD system, the process of determining a mapping priority or a mapping sequence of downlink sub-frames provides that a sub-frame which has a high probability of becoming a downlink sub-frame is assigned with a high priority or is placed at a position close to the head of the mapping sequence, and a sub-frame which has a low probability of becoming a downlink sub-frame is assigned with a low priority or is placed at a position close to the tail of the mapping sequence.

According to the resource mapping sequence, PUCCH resources for transmitting HARQ-ACK information of a sub-frame which has a low probability of becoming a downlink sub-frame locates closer to PUSCH resources. Therefore, when none of downlink sub-frames with small probabilities is scheduled, PUCCH resources located immediately next to the PUSCH are not occupied and available for being used as PUSCH resources, which increases channel resource utility ratio.

Based on the above resource mapping scheme, a process of performing resource mapping on sub-frames of the second category includes, in step 1, sorting sub-frames of the second category in a descending order of scheduling probabilities, and in step 2, mapping HARQ-ACK information of each sub-frame of the second category in turn onto PUCCH resources from PUCCH resources located close to the resources of the first category to PUCCH resources located far from the resources of first category. The above two steps are described in further detail as follows.

In step 1, sub-frames of the second category are sorted in a descending order of scheduling probabilities.

Before introducing the method of sorting the sub-frames of the second category, the method of determining the scheduling probabilities of the sub-frames of the second category is first introduced as follows.

The probability of a sub-frame becoming a downlink sub-frame may be determined by using the number of configuration schemes in which the sub-frame is used as a downlink sub-frame. For example, in the above Table 1, sub-frame 4 is used as downlink sub-frame in 4 configuration schemes, i.e. configurations 1, 2, 4, 5, and sub-frame 3 is used as downlink sub-frame in 2 configuration schemes, i.e. configurations 2 and 5. Therefore, sub-frame 4 can be regarded as having a high probability of becoming a downlink sub-frame than sub-frame 3 and thus is arranged before sub-frame 3 in the sorted sequence.

In practical deployment, different UL/DL configurations have different probabilities of being used. Therefore, the sub-frame in a frequently-used configuration scheme may be arranged before a sub-frame which is downlink in only a rarely-used configuration scheme in the sorted sequence. As such, the probability of a sub-frame becoming a downlink sub-frame may also be determined by the probability of a UL/DL configuration where the sub-frame is downlink is used. For example, supposing configurations 1 and 2 are frequently used, downlink sub-frames in these two configurations may be arranged before sub-frames which are downlink only in configurations 0, 3, 4, 5 and 6. According to the above Table 1, downlink sub-frames in configurations 1 and 2 are sub-frames 0, 1, 5, 6, 3, 8, 4, 9, and sub-frame 7 is downlink in other configurations. Therefore, sub-frame 7 may be arranged after sub-frames 0, 1, 5, 6, 3, 8, 4, 9 in the sorted sequence.

The foregoing two bases for determining the probability of a sub-frame becoming a downlink sub-frame may be used individually or in combination. Other manners may be adopted for determining the probability, and are not limited in the present invention.

The following are examples of sorting sub-frames of the second category.

(1) Example 1: A Method of Sorting All Candidate Downlink Sub-frames.

The order of downlink sub-frames is determined according to a sequence of sub-frame ID of downlink sub-frames. Candidate downlink sub-frames in all of the configurations are sub-frames whose sub-frame ID is 0, 1, 3, 4, 5, 6, 7, 8, 9. All of the candidate downlink sub-frames are sorted, and then the order of sub-frame IDs in the sorted sequence obtained is used for sorting sub-frames of the second category to obtain sorted sub-frames of the second category.

The serial number of the downlink sub-frame corresponding to element k in the downlink associating set is determined using an Equation according to HARQ-ACK in uplink sub-frame n indicating PDSCH in downlink sub-frame n−k or indicating SPS release and PDSCH to PUCCH/PUSCH timing scheme as shown in Table 2.

Accordingly, in the sorted sequence, sub-frames 0, 1, 5, 6 are placed before sub-frames 3, 4, 7, 8 and 9.

Any order of sub-frames 0, 1, 5, 6 is within the protection scope of the present invention. The order of sub-frames 9, 4, 8, 3, 7 may be (9, 4, 8, 3, 7). Since sub-frame 9 is downlink in configurations 1-5 according to Table 1 above, sub-frame 9 ranks before sub-frames 4, 8, 3, 7. Configurations 1 and 2 are frequently used, thus are used as an example for illustrating the sorting of the sub-frames. Sub-frames 9 and 4 are downlink sub-frames in both configurations 1 and 2, and sub-frames 8 and 3 are downlink sub-frames only in configuration 1. Thus, sub-frames 9 and 4 are placed before sub-frames 8 and 3. Any order of sub-frames 9, 4, 8, 3, 7 is within the scope of the present invention.

A sorted sequence of all candidate downlink sub-frames can be obtained by placing sub-frames 0, 1, 5, 6 before sub-frames 9, 4, 8, 3, 7 in any order, as in the following Equation (3):

$$D=(0, 5, 1, 6, 9, 4, 8, 3, 7) \qquad (3)$$

Sub-frames of the second category are sorted by using the sorted sequence of all of the candidate downlink sub-frames to obtain a sequence of sub-frames of the second category $s_0$, $s_1, \ldots, s_N$, and a sequence of downlink associating elements $p_0, p_1, \ldots, p_N$ corresponding to sub-frames of the second category can be obtained by using the relation between the downlink associating elements and the sub-frames.

For example, supposing the timing adopted by PDSCH HARQ is configuration 2, UL/DL configuration of a non-traffic adaptive UE specified by SIB1 signaling is configuration 0, and HARQ-ACK is to be fed back in an uplink sub-frame whose sub-frame ID n=2, the bundling window of the non-traffic adaptive UE is $W_1=\{n-6\}$, the downlink association set of the traffic adaptive UE is $K_2=\{8, 7, 4, 6\}$, and the bundling window of the traffic adaptive UE is $W_2=\{n-8, n-7, n-4, n-6\}$. According to method one in step 301, the sub-frames of the second category are $\{n-8, n-7, n-4\}$, and the sub-frame IDs are $\{4, 5, 8\}$. If the sub-frames are sorted according to Equation (3), a sequence of (5, 4, 8) is obtained, and the sorted sequence of the sub-frames of the second category is $\{n-7, n-8, n-4\}$.

In view of the foregoing, the method of sorting sub-frames of the second category includes identifying sub-frame IDs of all of candidate downlink sub-frames, sorting the sub-frame IDs in a descending order of scheduling probabilities, selecting sub-frames of the second category from the sorted sequence of all of the candidate downlink sub-frames while maintaining the order of the sub-frames to obtain a sorted sequence of sub-frames of the second category.

(2) Example 2: A Method Using Weights.

In this example, a weight is assigned to each of all candidate downlink sub-frames. During PUCCH resource mapping of sub-frames of the second category, a downlink sub-frame with the smallest weight is mapped first onto PUCCH resources which are closest to resources of the first category.

For example, a relation between the weights and downlink sub-frame IDs is as shown in Table 3.

TABLE 3

| Sub-frame ID | | | | | | | | |
|---|---|---|---|---|---|---|---|---|
| 6 | 1 | 5 | 0 | 9 | 4 | 8 | 3 | 7 |
| Weight 0 | 1 | 2 | 3 | 4 | 5 | 6 | 7 | 8 |

The relation as shown in Table 3 is then expressed using the following Equation (4). If a downlink sub-frame has an ID (Identification) of x in a frame and has a weight of Q(x), and according to Table 3, Q(x) is determined by the following Equation (4):

$$Q(x)=\{2-2x\}\bmod 10+1-\lfloor x/5 \rfloor \quad (4)$$

In Equation (4), $\lfloor \cdot \rfloor$ denotes a rounding down operation. Each sub-frame in the sequence of sub-frame IDs specified in the above example one is allocated with a weight in an ascending order of weight. The sub-frames of the second category are then sorted in an ascending order of weight to obtain a sorted sequence of sub-frames of the second category, i.e. $s_0, s_1, \ldots, s_N$.

The weights may be expressed as a function of elements in the downlink association set. If step 301 adopts the procedure in example one, for uplink sub-frame n, a downlink association set $K_1$ of UL/DL configuration of a non-traffic adaptive UE and a downlink association set $K_2=\{k_0, k_1, \ldots, k_{M-1}\}$ of a timing scheme of a traffic adaptive UE can be obtained according to the PDSCH to PUCCH/PUSCH timing scheme as shown above in Table 2. For element k in $K_2$, if $k \in K_2$ and $k \notin K_1$, the weight can be obtained by Equation (5), as follows:

$$Q_1(n,k)=\{2-2((n-k)\bmod 10)\}\bmod 10+1-\lfloor [(n-k)\bmod 10]/5 \rfloor \quad (5)$$

Elements belonging to $K_2$ and not belonging to $K_1$ are sorted in an ascending order of weight to obtain a sorted sequence $p_0, p_1, \ldots, p_N$ of downlink association elements for sub-frames of the second category.

If step 301 adopts the procedure of example two, for uplink sub-frame n, a downlink association set $K_2=\{k_0, k_1, \ldots, k_{M-1}\}$ of the timing scheme of a traffic adaptive UE according to the PDSCH to PUCCH/PUSCH timing scheme is as shown in Table 2. The weight $Q_1(n,k)$ of element k in $K_2$ can be obtained below according to Equation (6). The elements in $K_2$ are sorted in an ascending order of weight to obtain a sorted sequence $p_0, p_1, \ldots, p_N$ of downlink association elements for sub-frames of the second category.

For example, supposing the timing adopted by PDSCH HARQ is configuration 3, UL/DL configuration of a non-traffic adaptive UE specified by SIB1 signaling is configuration 0, and HARQ-ACK is to be fed back in an uplink sub-frame whose sub-frame ID n=2, the downlink association set of the non-traffic adaptive UE is $K_1=\{6\}$, and the downlink association set of the traffic adaptive UE is $K_2=\{8, 7, 4, 6\}$. The set of elements belonging to $K_2$ and not belonging to $K_1$ is $\{8,7,4\}$. The weight is obtained by using the downlink association elements according to Equations (6), as follows:

$$Q_1(8)=5, Q_1(7)=2, Q_1(4)=6, \quad (6)$$

and the downlink association elements of sub-frames of the second category are sorted in an ascending order of weight to obtain a sequence (7, 8, 4) of the downlink association elements.

It can be seen that the method for sorting sub-frames of the second category includes identifying sub-frame IDs of all candidate downlink sub-frames, setting a weight for each identified sub-frame ID with sub-frames having large scheduling probabilities assigned small weights, and sorting the sub-frames of the second category in an ascending order of weights of the sub-frame IDs to obtain a sorted sequence of sub-frames of the second category.

The weights of the sub-frames may be expressed as a function of elements in a downlink association set, and the weights of elements corresponding to the sub-frames of the second category in the downlink association set may be determined by using the function.

(3) Example 3: A Cyclic Shift Method.

Sub-frames in a bundling window $W_2$ or sub-frames of the second category are sorted in an ascending order of sub-frame IDs to obtain a first sorted sequence of the sub-frames. The downlink sub-frame IDs may be obtained using Equation (1).

If the bundling window $W_2$ includes a special sub-frame, leftward cyclic shift is performed on the first sorted sequence starting from the first special sub-frame on the left to obtain a second sorted sequence of the bundling window. If the bundling window $W_2$ does not include a special sub-frame, a second sorted sequence is obtained by reversing the first sorted sequence. Sub-frames of the first category are removed from the second sorted sequence, a sorted sequence of sub-frames of the second category $s_0, s_1, \ldots, s_N$ is directly obtained, or a sorted sequence $p_0, p_1, \ldots, p_N$ of downlink association elements corresponding to sub-frames of the second category is obtained by using the relation between the downlink association elements and the sub-frames of the second category.

The sorted sequence of sub-frames of the second category obtained using the above cyclic shift method also arranges the sub-frames in a descending order of probabilities.

(4) Example 4: A Method Using Upper Layer Indications.

In this method, the order of all candidate downlink sub-frame IDs or part of downlink sub-frame IDs is obtained from upper layer signaling. Sub-frames of the second category are sorted by using the sorted sequence of all of the candidate downlink sub-frames indicated and the relation between the sub-frame IDs and the sub-frames to obtain a sorted sequence of sub-frames of the second category $s_0, s_1, \ldots, s_N$, or a sorted sequence $p_0, p_1, \ldots, p_N$ of downlink association elements corresponding to sub-frames of the second category can be obtained by using the relation between the downlink associating elements and the sub-frames. The elements are in the same order in the sorted sequence of sub-frames of the second category and in the sequence of downlink sub-frames as indicated in the upper layer signaling.

(5) Example 5: A method Using a Table.

This example provides the sorted order of downlink association elements in a downlink association set in a table, and the order of downlink sub-frames in a bundling window can be obtained by using the order of the downlink association elements. The order of the downlink association elements may be obtained by using the above described methods, e.g. placing sub-frames 0, 1, 5, 6 before sub-frames 3, 4, 7, 8, 9, or placing a sub-frame belonging to configuration 1 before a downlink sub-frame belonging to configuration 2 and not belonging to configuration 1. The order of downlink association elements can be obtained by using any sorting method in the above example 1.

Two examples are given below. Tables 4 and 5 provide two sorted sequence of elements in a downlink association set.

If step 301 adopts the first classification category, the bundling window of a traffic adaptive UE is divided into two parts, sub-frames of the first category is the intersection of the bundling window and a bundling window of a non-traffic adaptive UE, and sub-frames of the second category are sub-frames only belonging to the bundling window of the traffic adaptive UE and not belonging to the bundling window of the non-traffic adaptive UE. There are two implementation methods as follows.

(5-1) Implementation Method 5-1:

For an uplink sub-frame n, a downlink association set $K_1$ under the UL/DL configuration of a non-traffic adaptive UE may be obtained according to the PDSCH to PUCCH/PUSCH timing, and a downlink association set $K'_2=\{k_0, k_1, \ldots, k_{M-1}\}$ under the timing of a traffic adaptive UE may be obtained from Table 4. The intersection of $K_1$ and $K'_2$ is removed from $K'_2$ to obtain a new set $K'_3=\{p_0, p_1, \ldots, p_N\}$ where elements are arranged in an order. Thus, the order of downlink association elements corresponding to sub-frames of the second category is $\{p_0, p_1, \ldots, p_N\}$. Elements are in the same order in $K'_3$ and $K'_2$.

TABLE 4

| UL/DL configuration | sub-frame n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 7, 6, 8, 4 | — | — | — | — | 7, 6, 8, 4 | — | — |
| 3 | — | — | 7, 6, 11 | 5, 6 | 4, 5 | — | — | — | — | — |
| 4 | — | — | 7, 11, 12, 8 | 7, 4, 5, 6 | — | — | — | — | — | — |
| 5 | — | — | 7, 6, 11, 12, 13, 4, 5, 8, 9 | — | — | — | — | — | — | — |
| 6 | — | — | 7 | 7 | 5 | — | — | 7 | 7 | — |

ApplyingUsing Table 4 as an example, supposing PDSCH HARQ of a traffic adaptive UE conforms to the timing scheme of configuration 2, the configuration indicated in SIB1 signaling for a non-traffic adaptive UE is configuration 0, when HARQ-ACK is to be fed back in an uplink sub-frame whose sub-frame ID n=2, the downlink association set of the non-traffic adaptive UE is $K_1=\{6\}$, and the downlink association set of the traffic adaptive UE is $K'_2=\{7, 6, 8, 4\}$ according to Table 4. The set of elements belonging to $K'_2$ and not belonging to $K_1$ is $\{7,8,4\}$. Therefore, the sorted order of downlink association elements corresponding to sub-frames of the second category is (7, 8, 4).

From Table 1 it can be seen that configuration 5 has one more downlink sub-frame 3 than configuration 4, and configuration 4 has one more downlink sub-frame 4 than configuration 3. When the PDSCH to PUCCH/PUSCH timing follows the configuration 5, the actual system may be restricted by only configurations 3, 4, 5, thus only sub-frames 3 and 4 change between uplink and downlink. If HARQ-ACK is fed back in an uplink sub-frame whose sub-frame ID n=2, sub-frames 3 and 4 are corresponding to downlink association elements 8 and 9. Therefore, when PDSCH to PUCCH/PUSCH timing follows configuration 5 and the actually-adopted system configurations are only 3, 4 and 5, placing downlink association elements 8 and 9 at the tail of the sequence can increase PUCCH resource utility ratio. This implementation method is not limited by the configuration and restrictions in the above example.

(5-2) Implementation Method 5-2:

For an uplink sub-frame n, a downlink association set $K_1$ under the UL/DL configuration of a non-traffic adaptive UE may be obtained according to the PDSCH to PUCCH/PUSCH timing, and a downlink association set $K'_2=\{k_0, k_1, \ldots, k_{M-1}\}$ under the timing of a traffic adaptive UE may be obtained from Table 5, as follows. The intersection of $K_1$ and $K'_2$ is removed from $K'_2$ to obtain a new set $K'_3=\{p_0, p_1, \ldots, p_N\}$ where elements are arranged in an order. Thus, the order of downlink association elements corresponding to sub-frames of the second category is $\{p_0, p_1, \ldots, p_N\}$. Elements are in the same order in $K'_3$ and $K'_2$.

TABLE 5

| UL/DL configuration | sub-frame n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 7, 6, 8, 4 | — | — | — | — | 7, 6, 8, 4 | — | — |
| 3 | — | — | 7, 6, 11 | 5, 6 | 4, 5 | — | — | — | — | — |
| 4 | — | — | 7, 11, 12, 8 | 7, 4, 5, 6 | — | — | — | — | — | — |
| 5 | — | — | 7, 6, 11, 12, 13, 8, 4, 9, 5 | — | — | — | — | — | — | — |
| 6 | — | — | 7 | 7 | 5 | — | — | 7 | 7 | — |

If the system specifies that the PDSCH to PUCCH/PUSCH timing follows the timing of configuration 5 and the actually-adopted system configuration is any configuration, downlink sub-frames in configurations 1 and 2 are given priority in the mapping process because configurations 1 and 2 are frequently used in practice. If HARQ-ACK is fed back in an uplink sub-frame whose sub-frame ID n=2 and the system specifies that the PDSCH to PUCCH/PUSCH timing follows the timing of configuration 5, downlink association element 5 may be placed at the tail of the downlink association set because the downlink sub-frame corresponding to downlink association element 5 is not downlink in configurations 1 and 2.

In Tables 4 and 5, downlink association elements 7, 6, 12, 11 in the downlink association set of sub-frame 2 correspond to sub-frames 0, 1, 5, 6 (or sub-frames 5, 6, 0, 1) respectively. These sub-frames are always downlink sub-frames in all of the configurations. Therefore, any order of downlink association elements 7, 6, 12, 11 in the downlink association set of any configuration is within the scope of the present invention, e.g. {11, 7, 12, 8} or {12, 7, 11, 8} in the downlink association set of sub-frame 2 under configuration 4, and so on. Likewise, in the downlink association set under any configuration, elements 6 and 7 in the downlink association set of sub-frame 7 may be in the order of {7, 6} or {6, 7}, which is also within the scope of the present invention.

In Tables 4 and 5, any order of elements 4, 5, 7, 9 in the downlink association set of sub-frame 2 under configuration 5, e.g., the downlink association set being {11, 7, 12, 6, 13, 4, 5, 8, 9} or {12, 7, 11, 6, 13, 5, 4, 8, 9}, is within the scope of the present invention.

If classification method 2 is adopted in step 301, PUCCH resources corresponding to a non-traffic adaptive TDD UE are resources of the first category, and PUCCH resources corresponding to a traffic adaptive TDD UE are resources of the second category. There are two methods for determining the mapping sequence of downlink sub-frames corresponding to PUCCH resources of the second category, which are as follows.

(5-3) Implementation Method 5-3:

For uplink sub-frame n, downlink association set $K'_2=\{k_0, k_1, \ldots, k_{M-1}\}$ can be obtained from Table 4 according to the PDSCH to PUCCH/PUSCH timing scheme. The sorted order of downlink association elements corresponding to sub-frames of the second category $\{p_0, p_1, \ldots, p_N\}=\{k_0, k_1, \ldots, k_{M-1}\}$.

For example, the PDSCH HARQ of a traffic adaptive UE adopts a timing scheme of configuration 2 and HARQ-ACK is to be fed back in uplink sub-frame n=2, the downlink association set of the traffic adaptive UE according to Table 4 is K'$_2$={7, 6, 8, 4}. The sorted order of downlink association elements corresponding to sub-frames of the second category is (7, 6, 8, 4).

(5-4) Implementation Method 5-4:

For uplink sub-frame n, downlink association set K'$_2$={k$_0$, k$_1$, ..., k$_{M-1}$} can be obtained from Table 5 according to the PDSCH to PUCCH/PUSCH timing scheme. The sorted order of downlink association elements corresponding to sub-frames of the second category {p$_0$, p$_1$, ..., p$_N$}={k$_0$, k$_1$, ..., k$_{M-1}$}.

In this implementation method, the method of sorting sub-frames of the second category includes:

pre-setting an order of downlink association elements in a downlink association set for each UL/DL configuration; wherein the downlink association elements are sorted according to a descending order of scheduling probabilities of downlink sub-frames corresponding to the downlink associating elements, and determining an order of downlink associating elements corresponding to a currently-indicated UL/DL configuration based on the pre-set order, selecting downlink association elements corresponding to the sub-frames of the second category from the sorted downlink association elements, and sorting the sub-frames of the second category according to the order of the selected downlink association elements.

In the above methods for sorting sub-frames of the second category, sub-frames of the same probability can be arranged in any order, and the order is not limited in the present invention.

(6) Implementation Method 6: Basic Method

When implementation method 1 is adopted in step 301, for uplink sub-frame, a downlink association set K$_1$ under UL/DL configuration of a non-traffic adaptive UE and a downlink association set K$_2$={k$_0$, k$_1$, ..., k$_N$} under the timing scheme of a traffic adaptive UE may be obtained according to the PDSCH to PUCCH/PUSCH timing as shown in Table 2. A new sorted set K$_3$={p$_0$, p$_1$, ..., p$_N$} may be obtained by removing the intersection of K$_1$ and K$_2$ from K$_2$, and the sorted order of downlink association elements corresponding to sub-frames of the second category is {p$_0$, p$_1$, ..., p$_N$}, where elements are in the same order in K$_2$ and K$_3$.

When the implementation method 2 is adopted in step 301, for uplink sub-frame n, a downlink association set K$_2$={k$_0$, k$_1$, ..., k$_N$} under the timing scheme of a traffic adaptive UE may be obtained according to the PDSCH to PUCCH/PUSCH timing scheme as shown in Table 2. The order of the downlink association elements corresponding to sub-frames of the second category is {p$_0$, p$_1$, ..., p$_N$}, i.e., {k$_0$, k$_1$, ..., k$_N$}.

The above implementation methods are also applicable for backward-compatible UEs.

In step 2, PUCCH resource mapping is performed on sub-frames of the second category according to the order determined in step 1, and sub-frames are mapped onto PUCCH resources from PUCCH resources located far from PUSCH resources to PUCCH resources located close to PUSCH resources.

The following provides examples of implementation methods.

(1) Implementation Method 1

Given the sorted sub-frames of the second category being {s$_0$, s$_1$, ..., s$_N$} or the sorted downlink association elements corresponding to sub-frames of the second category being {p$_0$, p$_1$, ..., p$_N$}, when PDCCH indicating PDSCH transmission or indicating downlink SPS release is detected in sub-frame s$_m$, the corresponding PUCCH resources are set forth in Equation (7), as follows:

$$n_{PUCCH}^{(1)} = \sum_{i=0}^{m-1} N_{PUCCH,s_i}^{(1)} + \hat{n}_{CCE} + \hat{N}_{PUCCH}^{(1)} \quad (7)$$

Where:

① $\hat{n}_{CCE}$ is the value obtained by performing modular operation on the serial number n$_{CCE}$ of the first CCE for transmitting the PDCCH in sub-frame s$_m$, i.e. $\hat{n}_{CCE}$=n$_{CCE}$ mod N$_{PUCCH,s_i}^{(1)}$;

② $\hat{N}_{PUCCH}^{(1)}$ is the start position of resources of the second category, and the method of obtaining the value of $\hat{N}_{PUCCH}^{(1)}$ will be described herein;

③ N$_{PUCCH,s_i}^{(1)}$ is the number of PUCCH resources for bearing the HARQ-ACK information allocated for downlink sub-frame s$_i$, and can be determined by using the number of CCE N$_{CCE,s_i}$ in sub-frame s$_i$, i.e., N$_{PUCCH,s_i}^{(1)}$=N$_{CCE,s_i}$. N$_{CCE,s_i}$ may be the number of CCEs (Control Channel Elements) in sub-frame s$_i$ obtained by using the number of control symbols read by PCFICH. A CCE contains 9 REG (Resource Element Group). A REG is composed of 4 REs (Resource Elements) in a control symbol. An RE is a carrier in an OFDM symbol. More details for the RE composing the REG can be found in 36.211V8.8.0, Section 6.2.4. Defining N$_{REG}$ as the number of REGs not allocated to PCFICH (Physical Control Format Indicator Channel) and PHICH (Physical Hybrid ARQ Indicator Channel) within a sub-frame, the number of CCEs in the sub-frame N$_{CCE}$=$\lfloor$N$_{REG}$/9$\rfloor$. The N$_{REG,s_i}$ of sub-frame s$_i$ may be obtained by using the number of control symbols in PCFICH, and N$_{CCE,s_i}$=$\lfloor$N$_{REG,s_i}$/9$\rfloor$.

N$_{PUCCH,s_i}^{(1)}$ may also be estimated based on the number of CCE in sub-frame s$_i$. As an example, a UE may firstly obtain an estimation of OFDM control symbols in sub-frame s$_i$, then obtain N$_{REG,s_i}$ by using the estimation of OFDM control symbols to obtain the number of CCE in sub-frame s$_i$ and the number of HARQ-ACK resources. Alternatively, a CCE estimate value $\hat{N}_{CCE,s_i}$ may be defined in the standards, such as $\hat{N}_{CCE,s_i}$=$\lfloor$[N$_{RB}^{DL}$×(N$_{sc}^{RB}$×c−4)]/36$\rfloor$, where c is an estimated value of the number of OFDM control symbols, N$_{RB}^{DL}$ is the number of downlink resource blocks, and N$_{sc}^{RB}$ is the number of carriers in each resource block, so as to obtain N$_{PUCCH,s_i}^{(1)}$. The estimated value of OFDM control symbols may be obtained by using the possible maximum value, e.g. the number of control symbols in a special sub-frame may be set as 2, and the number of control symbols in any other sub-frame may be set as 3, or may be obtained from upper layer signaling.

The number of PUCCH resources N$_{PUCCH,s_i}^{(1)}$ for bearing HARQ-ACK in sub-frame s$_i$ may be indicated via physical layer signaling or upper layer signaling; or, N$_{REG,s_i}$ of sub-frame s$_i$ may be obtained by using the number of control symbols in sub-frame s$_i$ indicated via physical layer signaling or upper layer signaling, then the value of N$_{CCE,s_i}$ may be obtained, and then the value of N$_{PUCCH,s_i}^{(1)}$ may be obtained.

(2) Implementation Method 2

Given the sorted sub-frames of the second category being {s$_0$, s$_1$, ..., s$_N$} or the sorted downlink association elements corresponding to sub-frames of the second category being {$p_0, p_1, \ldots, p_N$}, when PDCCH indicating PDSCH transmission or indicating downlink SPS release is detected in sub-frame $s_m$, the corresponding PUCCH resources are set forth in Equation (8), as follows:

$$n_{PUCCH}^{(1)} = m \cdot N_{PUCCH,s}^{(1)} + \hat{n}_{CCE} + \hat{N}_{PUCCH}^{(1)} \quad (8)$$

Where:

① $\hat{n}_{CCE}$ is the value obtained by performing modular operation on the serial number $n_{CCE}$ of the first CCE for transmitting the PDCCH in sub-frame $s_m$, i.e. $\hat{n}_{CCE} = n_{CCE} \mod N_{PUCCH,s}^{(1)}$;

② $\hat{N}_{PUCCH}^{(1)}$ is the start position of PUCCH resources bearing HARQ-ACK of a traffic adaptive UE, and the method of obtaining the value of $\hat{N}_{PUCCH}^{(1)}$ is described in the following; and ③ $N_{PUCCH,s}^{(1)}$ is the number of PUCCH resources bearing HARQ-ACK in each sub-frame, $N_{PUCCH,s}^{(1)} = \max(N_{CCE,s_j})$ can be obtained by using the maximum value of the number of CCE in each sub-frame, $N_{CCE,s_j}$ can be implemented by using the method in implementation method one.

Alternatively, $N_{PUCCH,s}^{(1)}$ may also be estimated based on the number of CCEs in sub-frame $s_i$. As an example, a UE may first obtain an estimation of OFDM control symbols in sub-frames of the second category, obtain $N_{REG_i}$ by using the estimation of OFDM control symbols, and then an estimated value of the number of CCE in sub-frames of the second category and the number of HARQ-ACK resources may be obtained according to a method defined in R8 (Release 8). Alternatively, a CCE estimate value $\hat{N}_{CCE,s_i}$ may be defined in the standards, such as $\hat{N}_{CCE,s_i} = \lfloor [N_{RB}^{DL} \times (N_{sc}^{RB} \times c - 4)]/36 \rfloor$, where c is an estimated value of OFDM control symbols, N is the number of downlink resource blocks, $N_{sc}^{RB}$ is the number of carriers in each resource block, so as to obtain $N_{PUCCH,s_i}^{(1)}$. The estimated value of OFDM control symbols may be obtained by using the maximum value of sub-frames of the second category, such as 3, or as indicated via upper layer signaling.

(3) Implementation Method 3: Block Interleaving Method, i.e. LTE Mapping Method

When PDCCH indicating PDSCH transmission or indicating downlink SPS release is detected in sub-frame $s_m$, PUCCH resources for sorted sub-frames $s_0, s_1, \ldots, s_N$ of the second category are set forth in Equation (8), as follows:

$$n_{PUCCH}^{(1)} = (N - m - 1) \times N_p + m \times N_{p+1} + n_{CCE} + \hat{N}_{PUCCH}^{(1)} \quad (8)$$

The UE needs to select a parameter p to make $N_p \leq n_{CCE} < N_{p+1}$, where $N_p = \max\{0, \lfloor [N_{RB}^{DL} \times (N_{sc}^{RB} \times p - 4)]/36 \rfloor\}$. $n_{CCE}$ is the serial number of the first CCE for transmitting the PDCCH in sub-frame $s_m$, or $\hat{n}_{CCE} = n_{CCE} \mod N_{PUCCH,s}^{(1)}$, where $N_{PUCCH,s}^{(1)}$ may be obtained by using the implementation methods one and two, or be indicated by the upper layer. $\hat{N}_{PUCCH}^{(1)}$ is the start position of PUCCH resources bearing HARQ-ACK of a traffic adaptive UE, and the method of obtaining the value of $\hat{N}_{PUCCH}^{(1)}$ is described in the following.

The start position $\hat{N}_{PUCCH}^{(1)}$ of the PUCCH resources bearing HARQ-ACK, i.e. the start position of resources of the second category, may be located immediately following the PUCCH resource field of a non-traffic adaptive UE or be indicated via upper layer signaling. If the start position $\hat{N}_{PUCCH}^{(1)}$ immediately follows the PUCCH resources of a non-traffic adaptive UE, $\hat{N}_{PUCCH}^{(1)}$ is set forth in Equation (9), as follows:

$$\hat{N}_{PUCCH}^{(1)} = \sum_{i=0}^{M-1} N_{CCE,i} + N_{PUCCH}^{(1)} \quad (9)$$

where, $N_{CCE,i}$ is the number of CCE in the i'th downlink sub-frame in a bundling window of a non-traffic adaptive UE, $N_{PUCCH}^{(1)}$ is provided in upper layer signaling of LTE R8, M is the size of the bundling window of the non-traffic adaptive UE.

$N'_{PUCCH}^{(1)}$ may also be determined as set forth in Equation (10), as follows:

$$\hat{N}_{PUCCH}^{(1)} = M \times N_{Pmax} + N_{PUCCH}^{(1)} \quad (10)$$

where, $N_{Pmax}$ is the maximum value of the number of CCE in each sub-frame in the bundling window of the non-traffic adaptive UE.

The start position $\hat{N}_{PUCCH}^{(1)}$ of the PUCCH resources may also be provided by upper layer signaling. The positions of PUCCH resource fields of traffic adaptive UEs and non-traffic adaptive UEs are determined by a base station.

Returning to FIG. 5, in step 303, HARQ-ACK information is transmitted in PUCCH resources determined in the mapping procedure.

The present invention comprises a controller for classifying PUCCH resources in sub-frame n into two categories, loading HARQ-ACK information of a sub-frame from the first category into a field belonging to resources of the first category, and mapping HARQ-ACK information corresponding to all of downlink data of sub-frames from the second category onto a field belonging to resources of the second category in a descending order of scheduling probability, with downlink data of larger scheduling probability mapped onto PUCCH resources located farther from PUSCH resources. The HARQ-ACK information loaded into resources of the first category comprises HARQ-ACK information of a UE from a first category, the HARQ-ACK information mapped onto resources of the second category comprises HARQ-ACK information of a UE from a second category, the first category of UEs adopts a PDSCH HARQ timing scheme different from that of the second category of UEs, the sub-frames of the first category correspond to the HARQ-ACK information loaded in the resources of the first category, and the sub-frames of the second category correspond to the HARQ-ACK information loaded in the resources of the second category.

The embodiments can be applied to traffic adaptive UEs, but are not limited to traffic adaptive UEs.

It can be seen that sub-frames of the second category are sorted in descending order of scheduling probabilities, and HARQ-ACK information of the sub-frames are mapped in turn onto PUCCH resources from PUCCH resources located far from PUSCH resources to PUCCH resources located close to the PUSCH resources. Therefore, HARQ-ACK information of downlink sub-frames with low scheduling probabilities is transmitted in PUCCH resources close to PUSCH resources. When the downlink sub-frames with low scheduling probabilities are not scheduled, those PUCCH resources located immediately next to the PUSCH resources can be used as PUSCH resources, thereby increasing a channel resource utility ratio.

The foregoing are examples of the present invention and are not for use in limiting the protection scope thereof. All modifications, equivalent replacements or improvements in accordance with the spirit and principles of the present invention shall be included in the protection scope of the present invention.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for physical uplink control channel (PUCCH) resources mapping in a wireless communication system, the method comprising:
classifying downlink sub-frames into first and second categories, based on scheduling probabilities of the downlink sub-frames, the scheduling probabilities being based on uplink-downlink configuration of a user equipment (UE);
mapping hybrid automatic repeat request acknowledgement (HARQ-ACK) information corresponding to sub-frames belonging to the first category to a first PUCCH resource field of the PUCCH resources in an uplink sub-frame;
mapping HARQ-ACK information corresponding to downlink sub-frames belonging to the second category to a second PUCCH resource field of the PUCCH resources in the uplink sub-frame; and
transmitting the HARQ-ACK information on the PUCCH resource.

2. The method of claim 1, wherein mapping the HARQ-ACK information corresponding to the downlink sub-frames belonging to the second category comprises:
sorting the downlink sub-frames belonging to the second category in a descending order of scheduling probabilities of the downlink sub-frames belonging to the second category, and
mapping the HARQ-ACK information corresponding to the sorted downlink sub-frames in turn onto a PUCCH resource sub-field located far from a physical uplink shared channel (PUSCH) resource to a PUCCH resource sub-field located close to the PUSCH resources, in the uplink sub-frame.

3. The method of claim 2, wherein sorting the downlink sub-frames comprises:
determining sub-frame IDs of subframes which are available for being used as a downlink sub-frame;
setting weights for the determined sub-frame IDs with sub-frames of higher scheduling probabilities having smaller weights; and
sorting the sub-frames belonging to the second category in an ascending order of the weights of the sub-frame IDs to obtain a sorted sequence of downlink sub-frames belonging to the second category.

4. The method of claim 3, wherein setting the weights comprises:
expressing a weights set for the sub-frames as a function of elements in a downlink association set, and determining the weight of an element corresponding to a sub-frame of the second category in the downlink association set by using the function of the element.

5. The method of claim 2, wherein sorting the downlink sub-frames comprises:
performing a first sorting on the sub-frames belonging to the second category in an ascending order of sub-frame IDs;
obtaining a sorted sequence of sub-frames belonging to the second category by performing a leftward cyclic shift on a sequence obtained after the first sorting beginning from the first special sub-frame on the left in the sequence when the sub-frames belonging to the second category include a special sub-frame; and
reversing the sequence obtained after the first sorting to obtain a sorted sequence of sub-frames belonging to the second category when the sub-frames belonging to the second category include no special sub-frame.

6. The method of claim 2, wherein sorting the downlink sub-frames comprises:
obtaining an upper layer signaling instruction from a base station which includes a sorted sequence of sub-frame IDs of sub-frames that are available for use as downlink sub-frames or a sorted sequence of part of downlink sub-frames; and
sorting the sub-frames of the second category according to the sorted sequence in the upper layer signaling instruction to obtain a sorted sequence of sub-frames belonging to the second category.

7. The method of claim 2, wherein sorting the downlink sub-frames comprises:
pre-setting an order of downlink association elements in a downlink association set for each uplink-downlink configuration, wherein the downlink association elements are in an descending order of scheduling probability of downlink sub-frames corresponding to the downlink association elements; and
determining an order of downlink association elements corresponding to a current UL/DL configuration based on the pre-set order, selecting downlink association elements corresponding to the sub-frames belonging to the second category from the downlink association elements corresponding to the current uplink-downlink configuration, and sorting the sub-frames of the second category according to the order of the downlink association elements picked out.

8. The method of claim 2, wherein mapping the HARQ-ACK information corresponding to the sorted downlink sub-frames belonging to the second category comprises:
mapping HARQ-ACK information of sub-frame $S_m$ in a sorted sequence $\{s_0, s_1, \ldots, s_N\}$ of sub-frames belonging to the second category onto PUCCH resources based on $$n_{PUCCH}^{(1)} = \sum_{i=0}^{m-1} N_{PUCCH,s_i}^{(1)} + \hat{n}_{CCE} + \hat{N}_{PUCCH}^{(1)},$$

wherein, $\hat{n}_{CCE} = n_{CCE} \bmod N_{PUCCH,s_i}^{(1)}$ is obtained by performing modular operation on the serial number $n_{CCE}$ of the first CCE (Control Channel Element) for transmitting the PDCCH in sub-frame $s_m$, $\hat{N}_{PUCCH}^{(1)}$ is a start position of the resources, and $N_{PUCCH,s_i}^{(1)}$ is an estimated value of the number of PUCCH resources allocated to sub-frame $s_i$ for delivering the HARQ-ACK information.

9. The method of claim 8, wherein $N_{PUCCH,s_i}^{(1)}$ is the number of CCEs in sub-frame $s_i$, or an estimated value of the number of CCEs in sub-frame $s_i$, and
wherein the estimated value of the number of CCE in sub-frame $s_i$ is determined by:
applying the number of CCEs which is obtained by using an estimated number of orthogonal frequency division multiplexing (OFDM) control symbols as the estimated value of the number of CCEs, or pre-setting a function associating the number of OFDM control symbols with the number of CCEs, and
determining the estimated value of the number of CCE by using the preset function and an estimated number of OFDM control symbols, wherein the estimated number of OFDM control symbols is a maximum number of OFDM control symbols available in sub-frame $s_i$ or informed by an upper layer signaling instruction.

10. The method of claim 9, wherein the preset function is expressed by $\hat{N}_{CCE,s_i}=\lfloor[N_{RB}^{DL}\times(N_{sc}^{RB}\times c-4)]/36\rfloor$, wherein c is an estimated number of OFDM control symbols, $N_{RB}^{DL}$ is a number of downlink resource blocks, and $N_{sc}^{RB}$ is a number of carriers in each resource block.

11. The method of claim 8, wherein when the resources of the second category immediately follow the resources of the first category, $$\hat{N}_{PUCCH}^{(1)} = \sum_{i=0}^{M-1} N_{CCE,i} + N_{PUCCH}^{(1)} \text{ or}$$

$$\hat{N}_{PUCCH}^{(1)} = M \times N_{Pmax} + N_{PUCCH}^{(1)};$$

wherein $N_{CCE,i}$ is a number of CCE in the i'th downlink sub-frame within a bundling window of the uplink sub-frame according to uplink-downlink configuration of a non-traffic adaptive UE, $N_{PUCCH}^{(1)}$ is a start position of the PUCCH resources, M is a number of downlink sub-frames in the sub-frame collection 1, and $N_{Pmax}$ is a maximum value of the number of CCE among the downlink sub-frames in the bundling window of the uplink sub-frame according to uplink-downlink configuration of a non-traffic adaptive UE.

12. The method of claim 8, wherein the start position $\hat{N}_{PUCCH}^{(1)}$ of the PUCCH resources is sent by a base station via an upper layer signaling.

13. The method of claim 2, wherein mapping the HARQ-ACK information corresponding to the sorted downlink sub-frames of the second category comprises:
mapping HARQ-ACK information of sub-frame $s_m$ in a sorted sequence $\{s_0, s_1, \ldots, s_n\}$ of sub-frames belonging to the second category onto PUCCH resources $$n_{PUCCH}^{(1)} = m \cdot N_{PUCCH,s}^{(1)} + \hat{n}_{CCE} + \hat{N}_{PUCCH}^{(1)},$$

wherein, $\hat{n}_{CCE} = n_{CCE} \bmod N_{PUCCH,s_i}^{(1)}$ is obtained by performing a modular operation on the serial number $n_{CCE}$ of the first CCE for transmitting the PDCCH in sub-frame $s_m$, $\hat{N}_{PUCCH}^{(1)}$ is a start position of the PUCCH resources, and $N_{PUCCH,s}^{(1)}$ is an estimated value of the universally-specified number of PUCCH resources allocated to each sub-frame $s_i$ for delivering the HARQ-ACK information.

14. The method of claim 13, wherein $N_{PUCCH,s}^{(1)}$ is an estimated value of the number of CCEs in all of the sub-frames of the second category, and
wherein the estimated value of the number of CCEs of the downlink sub-frames belonging to the second category is determined by:
applying the number of CCEs which is obtained by using an estimated number of OFDM control symbols as the estimated value of the number of CCEs of all the sub-frames in the second category, or pre-setting a function associating the number of OFDM control symbols with the number of CCEs of the sub-frames in second category, and
determining the estimated value of the number of CCE of the sub-frames in the second category by using the preset function and an estimated number of OFDM control symbols,
wherein the estimated number of OFDM control symbols is the maximum number of OFDM control symbols available in all of the sub-frames of the second category or indicated by an upper layer signaling instruction.

15. The method of claim 14, wherein the preset function is expressed by $\hat{N}_{CCE,s_i}=\lfloor[N_{RB}^{DL}\times(N_{sc}^{RB}\times c-4)]/36\rfloor$,
wherein c is an estimated number of OFDM control symbols, $N_{RB}^{DL}$ is a number of downlink resource blocks, and $N_{sc}^{RB}$ is a number of carriers in each resource block.

16. The method of claim 1, wherein classifying the downlink sub-frames comprises:
generating a first sub-frame set from downlink sub-frames within a bundling window of the uplink sub-frame according to the uplink-downlink configuration of the UE from the first category;
applying PUCCH resources which bear HARQ-ACK information of a downlink sub-frame belonging to the first sub-frame set as the first PUCCH resource field; and
applying PUCCH resources which bear HARQ-ACK information of a downlink sub-frame not belonging to the first sub-frame set as the second PUCCH resource field.

17. The method of claim 1, wherein the downlink sub-frames that carry downlink data of a non-traffic adaptive UE belong to the first category, and the downlink sub-frames that carry downlink data of a traffic adaptive UE belong to the second category.

18. An apparatus for PUCCH (physical uplink control channel) resource mapping, applied in a wireless communication system, the apparatus comprising:
a controller configured to:
classify downlink sub-frames into first and second categories, based on scheduling probabilities of the downlink sub-frames, the scheduling probabilities being based on uplink-downlink configuration of a user equipment (UE),
map hybrid automatic repeat request-acknowledgement (HARQ-ACK) information corresponding to downlink sub-frames belonging to the first category to a first PUCCH resource field of the PUCCH resources in an uplink sub-frame, and
map HARQ-ACK information corresponding to downlink sub-frames belonging to the second category to a second PUCCH resource field of the PUCCH resources in the uplink sub-frame; and
a transceiver configured to transmit the HARQ-ACK information on the PUCCH resources.

* * * * *